UNITED STATES PATENT OFFICE.

ANTHONY KUEGEL, OF JERSEY CITY, NEW JERSEY.

VARNISH.

1,080,461.  Specification of Letters Patent.  Patented Dec. 2, 1913.

No Drawing.  Application filed May 4, 1912. Serial No. 695,158.

*To all whom it may concern:*

Be it known that I, ANTHONY KUEGEL, a citizen of the United States, and a resident of Jersey City, in the county of Hudson and State of New Jersey, have invented a new and useful Improved Varnish, of which the following is a full, clear, and exact description.

My invention relates to a new and improved composition of matter, and an object of my invention is to form a clear varnish which will not be subject to "crawling" or "chilling"; which will adhere uniformly to glass, metal or wood; which will not discolor anilin and other dyes, and which will mix with bronze powder without decomposition or discoloration.

I prepare the varnish by passing ammonia gas through a suitable solvent to saturation, and then add to the dissolved ammonia gas, a soluble resinous substance. The ammonia gas may be dissolved in alcohol, in any proportion of alcohol and water, ether, acetone, carbon bisulfid, naphtha, benzin, or their equivalents, and for the resinous substance I may use resin, shellac, copal, or sandarac. A second method of preparing this varnish is to dissolve from four to five parts of rosin and one part of the hard gum, such as copal, in one of the above-outlined solvents, and passing the dry ammonia gas through this mixture until a clear solution is obtained, or until a clear and uniform filament is obtained on drying.

Having thus described my invention, I claim as new and desire to secure by Letters Patent:

1. A varnish comprising a solvent which is a hydrocarbon derivative, ammonium, and a resinous substance.
2. A varnish comprising a resinous substance, ammonium, and a solvent composed of oxygen, hydrogen, and carbon.
3. A varnish including a resinous substance, an alcohol and ammonia.
4. A varnish comprising a resinous substance, and a solvent saturated with ammonia gas.

In testimony whereof I have signed my name to this specification in the presence of two subscribing witnesses.

ANTHONY KUEGEL.

Witnesses:
 JOHN MILLER,
 WILLIAM DEIGNAN.